(No Model.)
J. RIDGE.
CASTER.
No. 418,928. Patented Jan. 7, 1890.
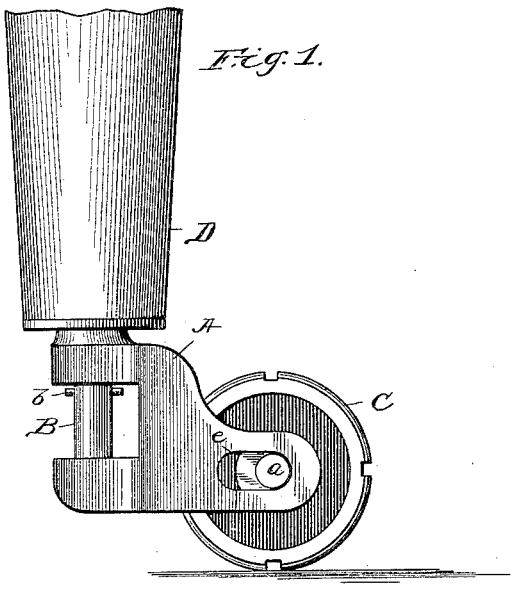
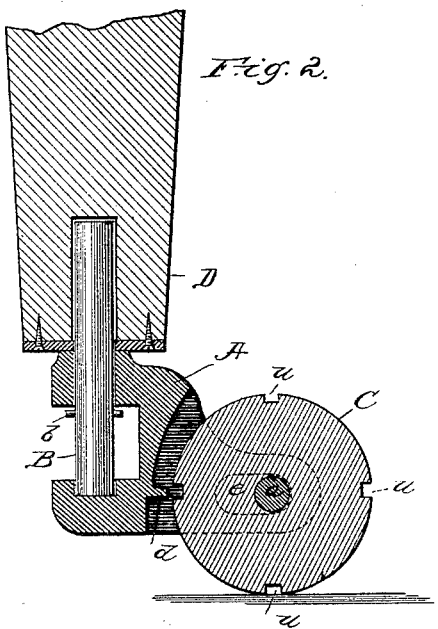
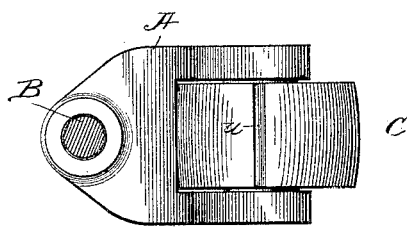
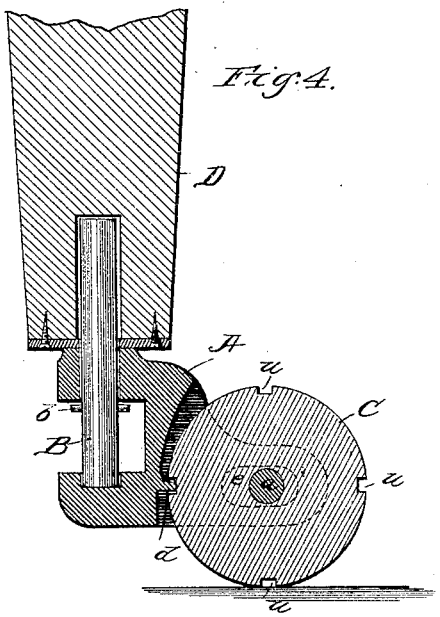
Witnesses.
Wm R Rheem
Jas. R. Andrews
Inventor.
Joseph Ridge

UNITED STATES PATENT OFFICE.

JOSEPH RIDGE, OF CHICAGO, ILLINOIS, ASSIGNOR OF ONE-HALF TO ALBERT RANSOM, OF SAME PLACE.

CASTER.

SPECIFICATION forming part of Letters Patent No. 418,928, dated January 7, 1890.

Application filed November 13, 1888. Serial No. 290,745. (No model.)

*To all whom it may concern:*

Be it known that I, JOSEPH RIDGE, of the city of Chicago, county of Cook, and State of Illinois, have invented new and useful Improvements in Casters, of which the following is a full and complete description, reference being had to the accompanying drawings.

The purpose of my invention is to provide against swerving from the direction in which the force is applied in moving furniture or articles supported upon casters. As heretofore constructed the wheel of a caster will rotate either way upon its axle. Thus, notwithstanding the crank character of the caster, resulting from the difference in vertical planes between the axis of the wheel and the axis of the shank, the tendency is for the wheel to move some distance preceding the shank before the revolution takes place that brings the wheel in the rear. The result of this is that the furniture does not at once respond to the direction in which the force is applied, thereby frequently causing collisions with other articles of furniture, and in any event causes an unsatisfactory result. To obviate this I have provided for locking the casterwheel when its position is such that if permitted to rotate it would precede the shank. This causes a revolution at once, or nearly so, when force is applied, whereby the wheel is brought in rear of the shank and each caster of the set thus brought into the same relative position. Further force applied results in the article being moved in obedience to the direction of such force.

For a more definite description reference is had to the accompanying drawings, wherein—

Figure 1 is a side elevation. Fig. 2 is a vertical section. Fig. 3 is a plan view, and Fig. 4 is a vertical section differing from Fig. 2 in the relative position of the wheel.

A represents the body of the caster, in which is pivotally seated the shank of spindle B, having a pin *b* between the upper and lower portions of part A to keep it in position. The upper end of shank B extends into leg D. The wheel C is provided on its periphery and transversely with grooves or channels *u* at suitable or desirable intervals. The bearings *e* in the extensions of parts A for axle *a* of the wheel are horizontally elongated. Between the two extensions within which the wheel rotates is provided a tongue *d*.

As shown in Fig. 2, the wheel-axle is in the outer portion of its elongated bearing, which is the condition when the wheel is moving in rear of the shank, the wheel at such time being free from the tongue *d*. If, however, when force is applied to move the furniture, the wheel should be in such position as to precede the shank, the relative position of the axle with its bearings is changed. The wheel is thereby forced back until the tongue *d* engages with grooves *u*, thus locking the wheel and causing at once a pivotal movement that brings the wheel to the rear. I have shown in this example one method of accomplishing the desired result, which I consider preferable in the matter of cost. It may, however, be accomplished in numerous ways. The shank or that portion directly upon which is seated the furniture-leg may be constructed in any of the usual forms or any desirable form.

Having thus fully described my said invention, what I claim, and desire to secure by Letters Patent, is—

In a furniture-caster, the combination, with the body of the caster having horizontally-elongated axle-bearings and a tongue or detent, of a wheel provided with grooves or channels at suitable intervals, and having an axle to engage said axle-bearings, whereby the wheel is permitted to move to and fro in said bearings, so that one of said transverse grooves or channels is engaged on said tongue or detent, thus locking the wheel, substantially as described.

JOSEPH RIDGE.

Witnesses:
 WM. RHEEM,
 JAS. R. ANDRAWS.